United States Patent [19]
Nishimura et al.

[11] Patent Number: 5,638,278
[45] Date of Patent: Jun. 10, 1997

[54] APPARATUS FOR DETECTING AN OCCURENCE OF MISFIRING IN AN ENGINE CYLINDER

[75] Inventors: Yukinobu Nishimura; Akira Demizu, both of Hyogo, Japan

[73] Assignee: Mitsubishi Denki Kabushiki Kaisha, Tokyo, Japan

[21] Appl. No.: 243,007

[22] Filed: May 16, 1994

Related U.S. Application Data

[63] Continuation of Ser. No. 946,101, Sep. 17, 1992, abandoned.

[30] Foreign Application Priority Data

Sep. 18, 1991 [JP] Japan ................... 3-238058

[51] Int. Cl.$^6$ ........................................ G06G 7/70
[52] U.S. Cl. ................ 364/431.08; 364/431.03; 364/431.04; 364/431.07; 73/117.3; 73/116; 123/436; 123/419
[58] Field of Search ............... 364/431.05, 431.08, 364/431.01, 431.07, 431.03, 424.03, 565, 431.04; 73/116, 117.3, 112, 118, 115, 117.2; 123/589, 436, 489, 339, 419, 416, 417, 414; 60/277, 721, 620, 619

[56] References Cited

U.S. PATENT DOCUMENTS

| | | | |
|---|---|---|---|
| 4,445,326 | 5/1984 | Lyon | 60/277 |
| 4,503,821 | 3/1985 | Miyaki et al. | 123/357 |
| 4,586,369 | 5/1986 | Volger | 73/117.3 |
| 4,635,590 | 1/1987 | Gerace | 123/27 R |
| 4,697,561 | 10/1987 | Citron | 123/339 |
| 4,883,038 | 11/1989 | Nakaniwa | 123/436 |
| 4,987,770 | 1/1991 | Nanyoshi et al. | 73/115 |
| 5,088,318 | 2/1992 | Osawa | 73/117.3 |
| 5,109,695 | 5/1992 | James et al. | 73/117.3 |
| 5,129,379 | 7/1992 | Kaneyasu et al. | 123/436 |
| 5,132,909 | 7/1992 | Schroeder et al. | 364/431.03 |
| 5,172,665 | 12/1992 | Kuroda | 123/339 |
| 5,191,788 | 3/1993 | Nishimura | 73/117.3 |
| 5,216,915 | 6/1993 | Sakamoto | 73/117.3 |
| 5,222,394 | 6/1993 | Imai | 73/117.3 |
| 5,237,504 | 8/1993 | Holmes et al. | 364/431.08 |
| 5,257,533 | 11/1993 | Inach | 73/116 |
| 5,307,670 | 5/1994 | Imai et al. | 73/117.3 |

FOREIGN PATENT DOCUMENTS

| | | |
|---|---|---|
| 4002209 | 8/1991 | Germany . |
| 4131383 | 3/1992 | Germany . |
| 58-19532 | 2/1983 | Japan . |

OTHER PUBLICATIONS

Plapp, Gunther, et al., "Methods of On–Board Misfire Detection," *Society of Automotive Engineers,* 1990 (SAE–SP–819), pp. 9–20.

*Primary Examiner*—Kevin J. Teska
*Assistant Examiner*—Jacques Louis-Jacques
*Attorney, Agent, or Firm*—Sughrue, Mion, Zinn, Macpeak & Seas

[57] ABSTRACT

In a misfire detecting device for an internal combustion engine having a plurality of cylinders, revolution detecting device detects the revolution of an engine; arithmetic device calculates deflections in revolution of the engine for each of the cylinders on the basis of a period of revolution of the engine in correspondence to the order of combustion of the cylinders; threshold value determining device determines a misfire decision threshold value for the cylinders from a value obtained by smoothing arithmetic values which are determined for the cylinders by the arithmetic device, and a predetermined value; and misfire deciding device compares the arithmetic values provided by the arithmetic device with the threshold value to comparison, to determine the occurrence of a misfire in any one of the cylinders.

6 Claims, 9 Drawing Sheets

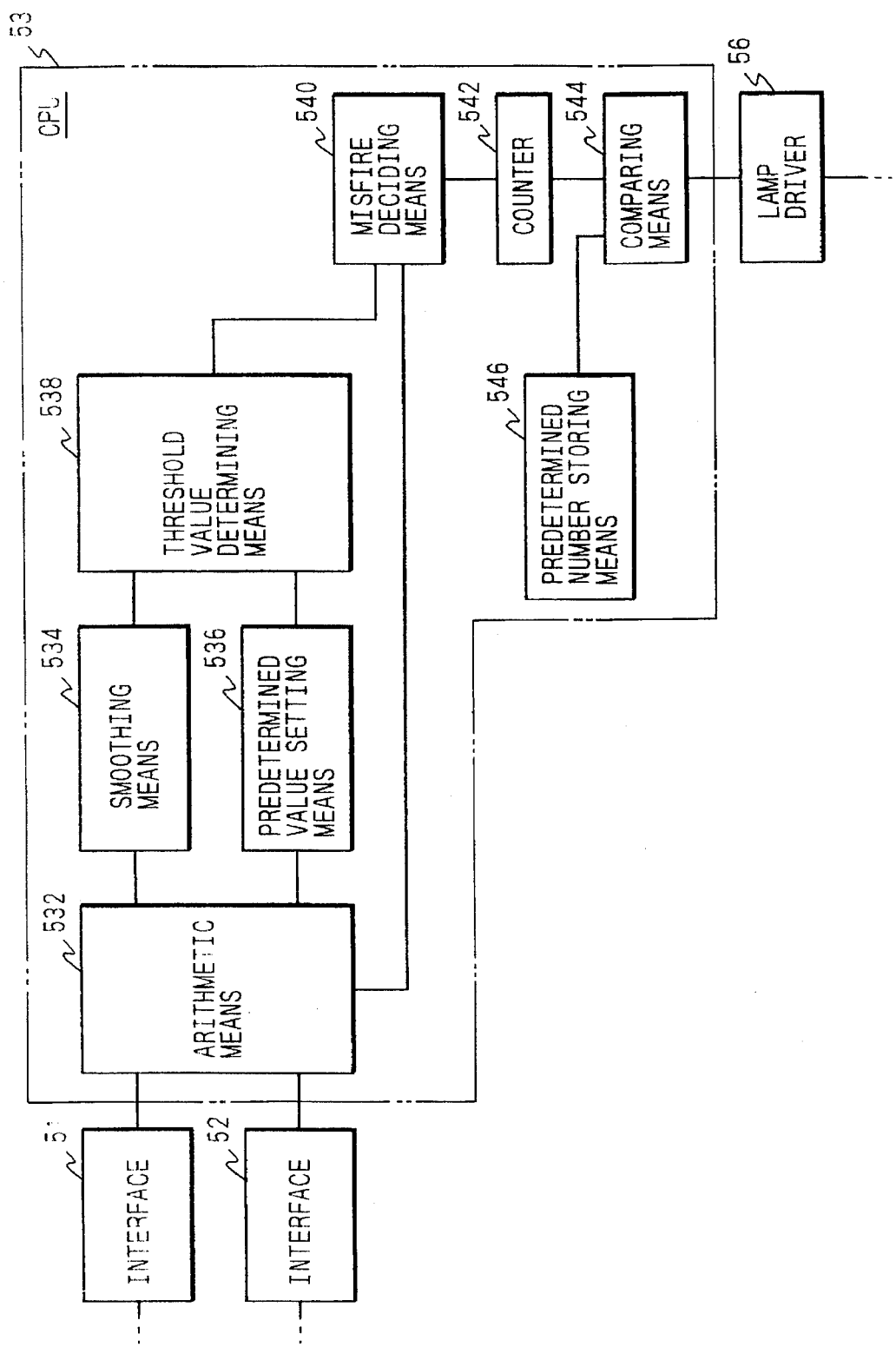

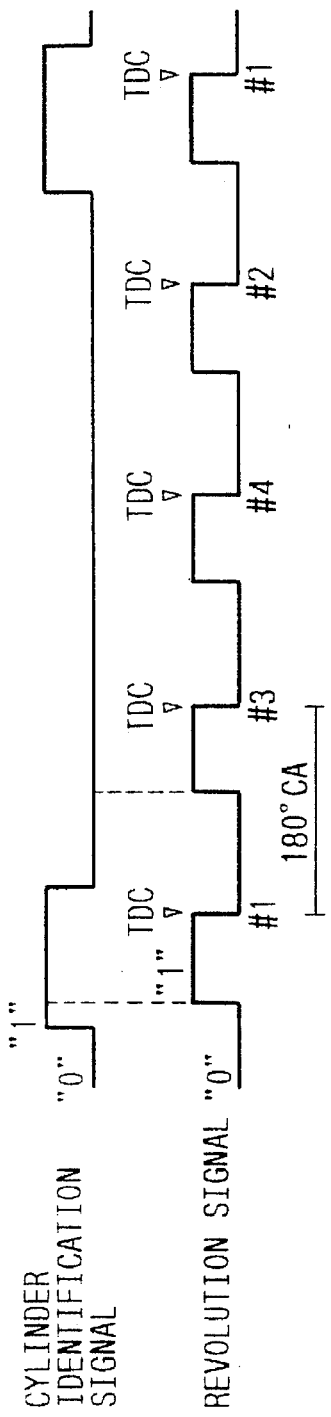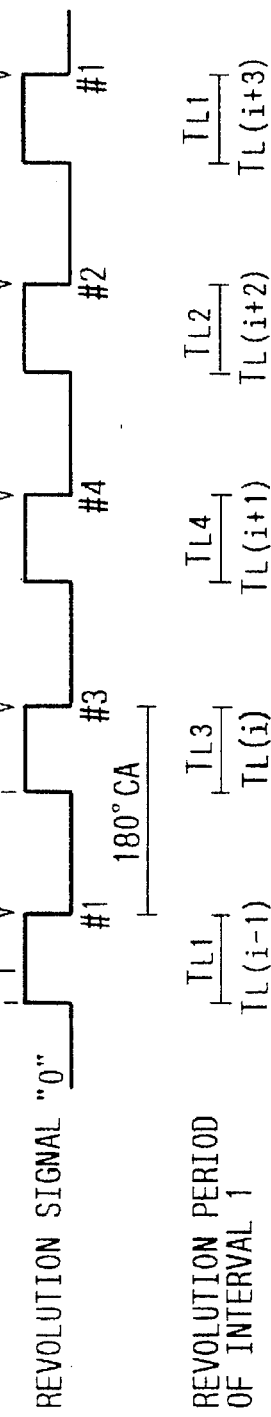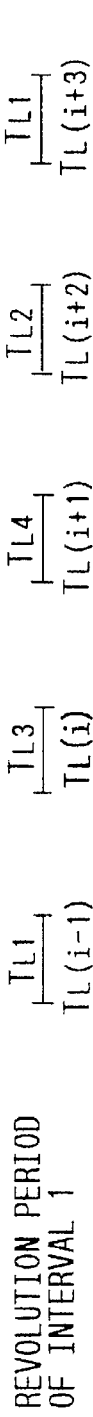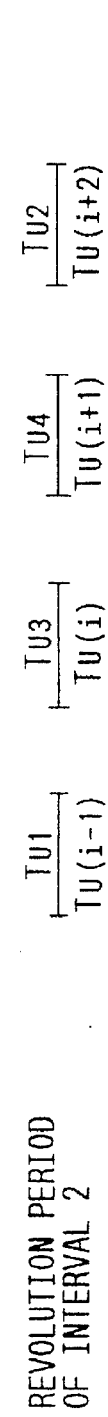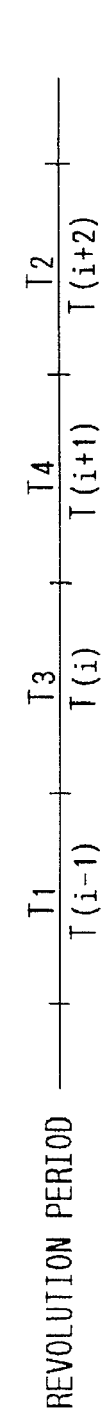

FIG. 7(a)
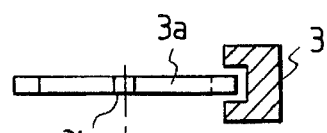
FIG. 7(b)
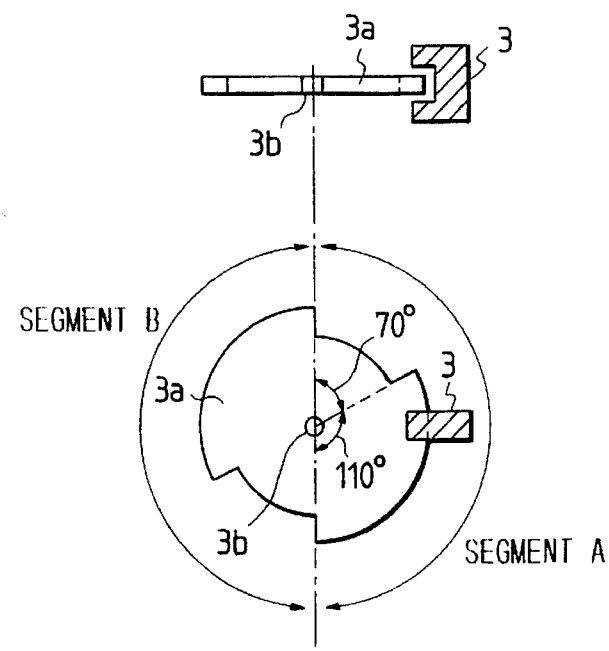
FIG. 8(a) REVOLUTION SIGNAL
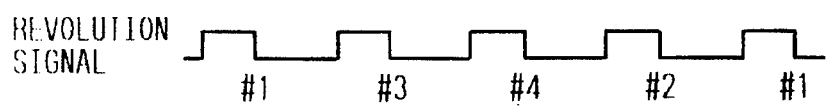
FIG. 8(b) SEGMENT A
FIG. 8(c) SEGMENT B
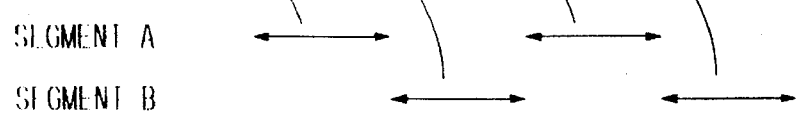

and is able to suppress the effects of the mechani-
APPARATUS FOR DETECTING AN OCCURENCE OF MISFIRING IN AN ENGINE CYLINDER This application is a continuation of Ser. No. 07/946,101 filed Sep. 17, 1992 now abandoned.

BACKGROUND OF THE INVENTION

This invention relates to a misfire detecting device for detecting the occurrence of misfire in an internal combustion engine.

There are available a variety of misfire detecting devices for internal combustion engines. Japanese Patent Application (OPI) No. 19532/1983 (the term "OPI" as used herein means an "unexamined published application") has disclosed a misfire detecting device which is based on deflections in revolution of an engine. The device detects the difference between the speed of revolution in the first half of an expansion stroke of the engine and that in the second half, to determine whether or not a misfire has occurred.

Another example of the conventional misfire detecting device is designed as follows: A revolution period deviation is detected every ignition period, and it is divided by a predetermined average value of revolution period, to obtain a revolution deflection coefficient. The coefficient thus obtained is utilized to determine the presence or absence of a misfire.

As was described above, the conventional misfire detecting device operates on the deflections in revolution of the engine; that is, it detects the occurrence of a misfire on the fact that, when a misfire occurs in an engine, the period of revolution of the cylinder where the misfire has occurred is increased. However, effects of its revolution detecting segment are not taken into account. That is, the device suffers from the difficulty that the mechanical dimensional error of the revolution detecting segment is superposed on a revolution signal, as a result of which an erroneous decision is made on the occurrence of a misfire.

SUMMARY OF THE INVENTION

Accordingly, an object of this invention is to eliminate the above-described difficulty accompanying a conventional misfire detecting device.

More specifically, an object of the invention is to provide a misfire detecting device for an internal combustion engine which is able to detect deflections in revolution of the engine thereby to detect the occurrence of a misfire with high accuracy, and is able to suppress the effects of the mechanical dimensional error of the revolution detecting segment.

The foregoing object of the invention has been achieved by the provision of a misfire detecting device for an internal combustion engine having a plurality of cylinders, which, according to the invention, comprises: revolution detecting means for detecting a period of the revolution of an engine; arithmetic means for calculating deflections in revolution of said engine for each of said cylinders on the basis of a period of revolution of said engine detected by said revolution detecting means in correspondence to the order of combustion of said cylinders; threshold value determining means for determining a misfire decision threshold value for said each cylinder on the basis of a predetermined value of said deflection and each value obtained by smoothing the arithmetic values which are determined corresponding to said cylinders by said arithmetic means; and misfire deciding means for subjecting said arithmetic values provided by said arithmetic means and said threshold value to comparison, to determine the occurrence of a misfire in any one of said cylinders.

In the device, the predetermined value is set according to a number of revolutions per minute of the engine and a load given to the engine.

With the device, deflections in revolution of the engine are calculated in correspondence to the order of combustion of the cylinders in the engine, so that the deflections in revolution of the engine can be detected quickly. The arithmetic values are smoothed for every cylinder, and the arithmetic values thus smoothed and the predetermined value are utilized to determine the threshold values. This will suppress the effect of the mechanical dimensional error of the revolution detecting segment, and reduce the effect of the deflection in combustion or the effect of transient noises. In addition, the predetermined value is determined from the number of mechanical revolutions and the load, so that most suitable threshold values are set for the operating ranges, and therefore the occurrence of misfires can be detected in a wide range of operation.

The nature, principle, and utility of the invention will be more clearly understood from the following detailed description of the invention when read in conjunction with the accompanying drawing.

BRIEF DESCRIPTION OF THE DRAWINGS

In the accompanying drawings:

FIG. 1(b) is a block diagram explaining the operation of the present invention of the CPU in the block diagram shown in FIG. 1a;

FIGS. 2(a) to 2(f) are a time chart for a description of the operation of the misfire detecting device according to the invention;

FIGS. 7(a) and 7(b) are a front view and a plan view showing a revolution signal sensor and a rotor in the device of the invention, respectively;

FIGS. 8(a) to 8(c) are diagrams showing a revolution signal with revolution detecting segments in the device of the invention;

DETAILED DESCRIPTION OF THE PREFERRED EMBODIMENT

A misfire detecting device, according to one embodiment of this invention, will be described with reference to the accompanying drawings.

Figure 1A:
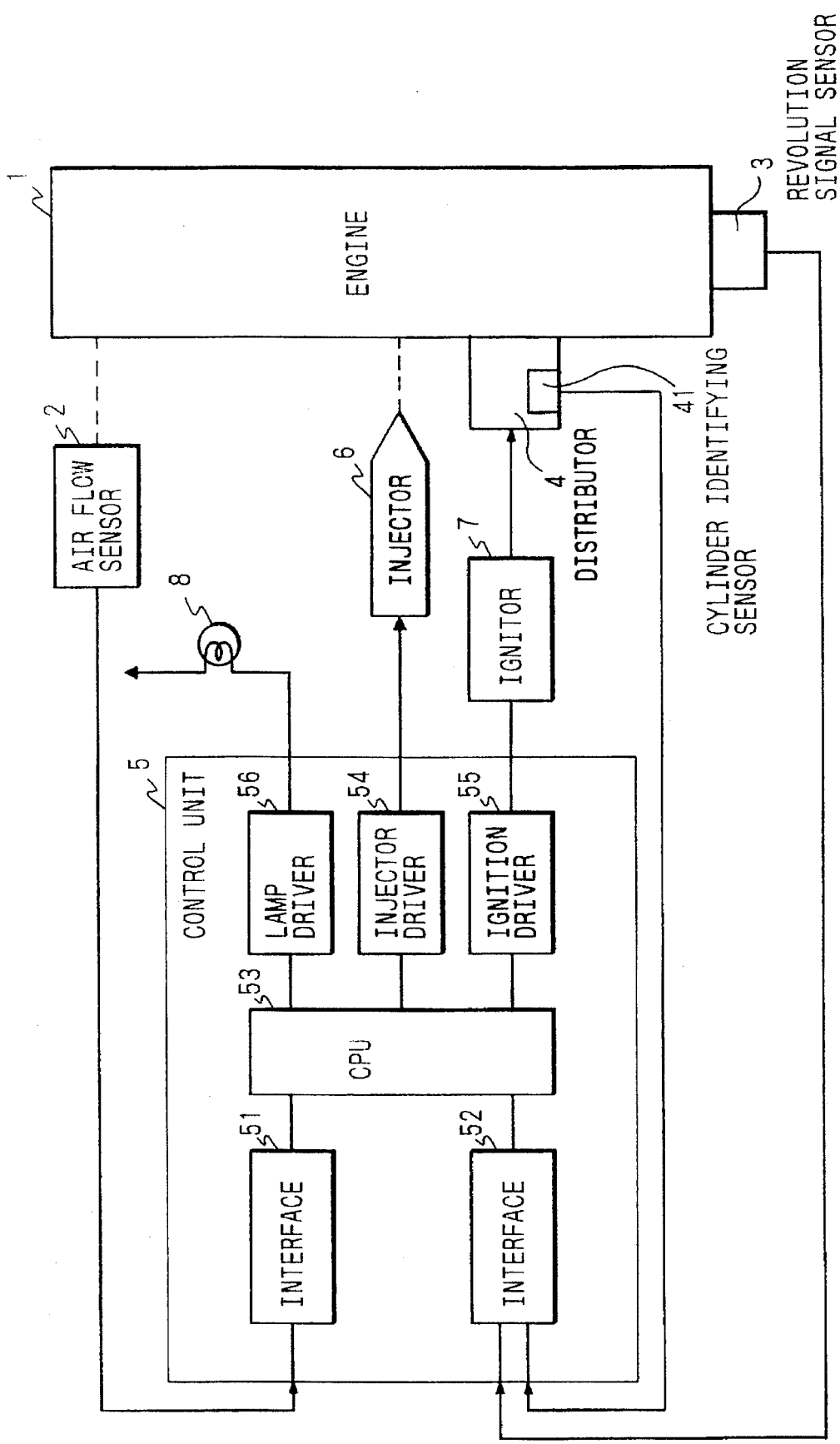
FIG. 1(a) is a block diagram showing the arrangement of a misfire detecting device according to this invention.

FIG. 1(a) shows the arrangement of the misfire detecting device according to the invention. In FIG. 1(a), reference numeral 1 designates a four-cylinder type gasoline engine; 2, air flow sensor set in an air intake passageway of the engine 1, to apply a signal representing a quantity of intake air (hereinafter referred to as "an intake air quantity signal", when applicable) to a control unit 5; 3, a revolution signal sensor mounted on the crank shaft of the engine 1, to apply a revolution signal to the control unit 5; and 4, a distributor mounted on the cam shaft of the engine 1. The distributor 4 incorporates a cylinder identifying sensor 41 which provides a cylinder identification signal, which is applied to the control unit 5. The control unit 5 receives the air intake quantity signal, the revolution signal, and the cylinder identification signal, and other signals not shown (such as a water temperature signal, and a throttle degree-of-opening signal), to drive an injector 6 and an igniter 7, and detects a misfire, to turn on a warning lamp 8. As for the warning lamp 8, another lamp may be commonly used which is provided for a purpose other than that of warning the occurrence of a misfire.

The control unit 5 comprises: an analog interface 51; a digital interface 52; and a central processing unit (CPU) 53 which receives the outputs of the interfaces 51 and 52 to perform operations according to a predetermined program, thereby to activate an injector driver 54, a ignition driver 55, and a lamp driver 56.

FIG. 1(b) is a block diagram showing the operation of the CPU 53. In the CPU 53, an arithmetic means 532 calculates the deflections of the revolution for each cylinder of the engine in the order of combustion of the cylinders according to a period of revolution of the engine, the number of revolutions of the engine, and the load given to the engine; a smoothing means 534 smooths the calculation value of the deflections obtained by the arithmetic means 532; a predetermined value setting means 536 determines a predetermined value of the deflection by mapping the number of revolutions and the load obtained by the arithmetic means 532; a threshold value determining means 538 receives the outputs of the smoothing means 534 and the predetermined value setting means 536 to determine a threshold value; a misfire deciding means 540 compares the arithmetic values provided by said arithmetic means with the threshold value to decide the occurrence of a misfire in any one of said cylinders; a counter means 542 counts the number of misfires decided by the misfire deciding means 540 in a predetermined cycle; a comparing means 544 compares the number of misfires counted by the counter means 542 with a predetermined number outputted by a predetermined number storing means 546 and outputs a signal to the lamp driving unit 56 when the number of misfire exceeds the predetermined value.

The operation of the misfire detecting device thus organized is as shown in FIGS. 2(a) to 2(f). FIG. 2(a) and 2(b) show the aforementioned cylinder identification signal and the revolution signal, respectively. As is seen from FIGS. 2(a) and 2(b), one cycle of the cylinder identification signal corresponds to four cycles of the revolution signal shown in FIG. 2(b). The cylinder whose cylinder identification signal is raised to "1" at the rise (a crank angle (CA) of 70° before the top dead center (TDC)) of the revolution signal will be referred to as "a No. 1 cylinder", and the cylinders whose cylinder identification signals are set to "0", will be referred to as "No. 3, No. 4 and No. 2 cylinders" in the order of power distribution. FIG. 2(c) shows an interval 1 revolution period $T_L$ which is the period of the interval in which the revolution signal is at "1"; i.e., the interval between a crank angle of 70° before the top dead center (hereinafter referred to as "BTDC70°CA", when applicable) and the top dead center (hereinafter referred to as "TDC", when applicable). In FIG. 2(c), the suffix (i) of the character (L) corresponds to the order of combustion of the cylinders.

Similarly, an interval 2 revolution period $T_U$ as shown in FIG. 2(d) is the period of the interval in which the revolution signal is at "0"; i.e., the interval between the TDC and a crank angle of 110° after the top dead center (hereinafter referred to as "ATDC110°CA", when applicable). A revolution period T as shown in FIG. 2(e) is such that $T=T_L+T_U$. This revolution period is employed for a fuel processing operation and an ignition processing operation. FIG. 2(f) shows an igniter waveform as a coil energizing waveform, for reference.

Figure 3:
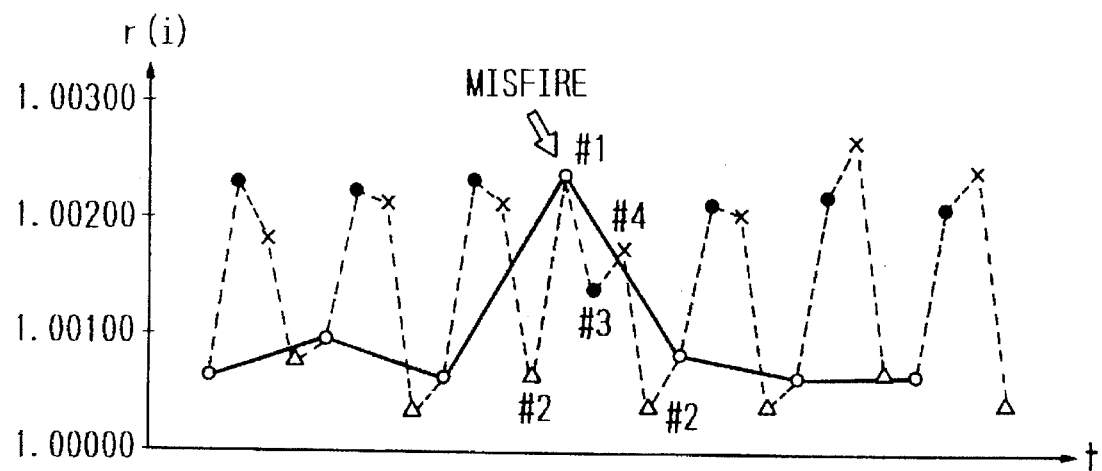
FIG. 3 is a characteristic diagram for a description of an arithmetic equation r(i) in the invention.

An arithmetic equation, $r(i)=K_r T_U(i)/T_L(i)$ where Kr is the constant, for detecting deflections in revolution of the engine in correspondence to the order of combustion will be described with reference to FIG. 3, a characteristic diagram. More specifically, the characteristic shown in FIG. 3 is for the case where the engine is in a steady state that the operating range is of 6000 rpm with −400 mmHg, a misfire occurs with the No. 1 cylinder. The detection of a misfire from a deflection of revolution becomes difficult as the speed of revolution increases or the load decreases. This will become more apparent from the following equation:

$$t-t_L=I\, d\omega/dt$$

where t is the torque produced, $t_L$ is the load torque, I is the inertia, and ω is the rotational angular speed.

When the speed of revolution is increased with the load maintained unchanged, t and $t_L$ are substantially not changed, and I is constant, and therefore dω/dt is constant. As the speed of revolution increases, the period of revolution is decreased, so that the width of deflection of the rotational angular speed ω is decreased. In the case where the load is decreased with the speed of revolution maintained unchanged, the produced torque t is decreased, and therefore the width of deflection of the rotational angular speed is decreased. On the other hand, when a misfire occurs with the No. 1 cylinder, the torque t with respect to the cylinder is decreased. And the effect of the inertia I on the torque t is relatively increased as the speed of revolution increases while the load decreases, and its effect on the rotational angular speed is decreased.

Hence, the above-described operating range may be considered to be the severest in the actual operating range. In FIG. 3, in order to normalize the measuring period, $K_r$ is set to 70/110 in the above-described equation r(i), which is equivalent to a period ratio measurement with the crank angle range maintained the same. Because of the phase difference between the torque and the angular speed, when combustion is normal, r(i) is not smaller than one (1), and when a misfire occurs, r(i) is not equal to one (1); that is, there are some deviation in those relations. Let us consider r(i) in the order of combustion of the cylinders. It is rather difficult to detect the No. 1 cylinder with which a misfire has occurred, by using the difference (r(i)−r(i−1)) between the cylinder and another cylinder, (which is, for instance, the cylinder in which combustion occurred before the No. 1 cylinder) however, it is sufficiently possible when the engine is operated in a range of low revolution, for instance 3000 rpm. This is because each difference of the deflection of the combustion between the cylinders is large.

Figure 4:
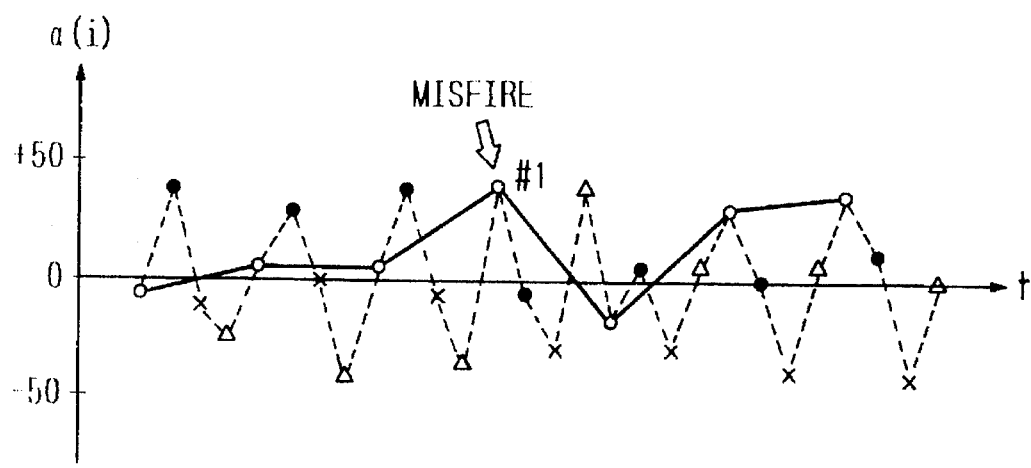
FIG. 4 is also a characteristic diagram for a description of an arithmetic equation $\alpha(i)$ in the invention.
Figure 5:
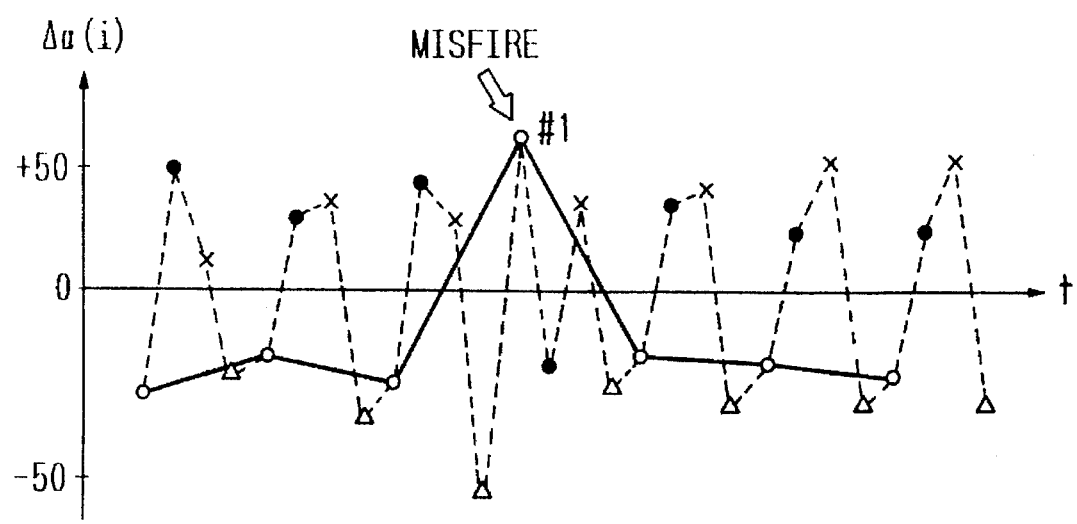
FIG. 5 is a characteristic diagram for a description of an arithmetic equation $\Delta(i)$ in the invention.

Now, let us consider r(i) separately according to the cylinders with reference to FIG. 3. As for the No. 1 cylinder, r(i) is greatly increased at the occurrence of a misfire, as indicated by the solid lines, which means that a misfire can be detected. This is due to the fact that the effect of the above-described differences in combustion between the cylinders is eliminated. FIGS. 4 and 5 are for a description of arithmetic equations to improve the sensitivity of the arithmetic equation r(i). In the case of FIG. 4, the arithmetic equation r(i) is modified into an equation of angular acceleration α(i):

$$\alpha(i)=T_L(i)\{T_U(i)/T_L(i)-T_U(i-1)/T_L(i-1)/T(i-1)^3$$

In the case of FIG. 5, an angular acceleration difference Δα(i) is obtained:

$$\Delta\alpha(i)=\alpha(i)-\alpha(i+1)$$

Δα(i) in FIG. 5 is somewhat higher in sensitivity than r(i) in FIG. 3. This means that the effect is added which is obtained from the fact that, in the case of FIG. 3, r(i) is increased at the occurrence of a misfire in the No. 1 cylinder, and it is decreased with the next cylinder; that is, with the No 3. cylinder.

Figure 6:
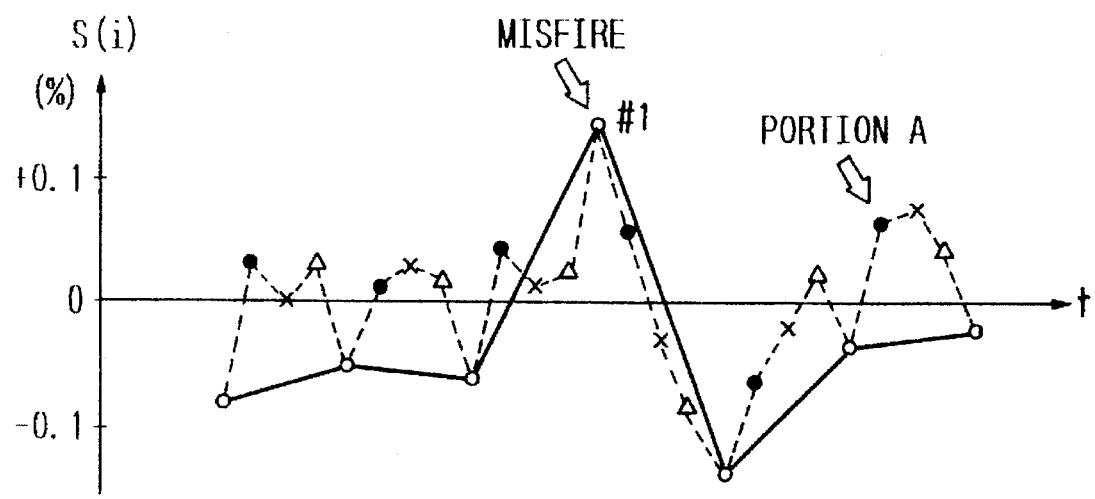
FIG. 6 is a characteristic diagram for a description of an arithmetic equation S(i) in the invention.

FIG. 6 shows a result of an arithmetic operation using a period deviation. In this case, the arithmetic equation S(i) is as follows:

$$S(i) = \frac{T(i) - T(i)}{\frac{1}{n}\sum_{m=i-n+1}^{i} T(m)} \quad n=4$$

where n is the number of cylinders.

In this operating range, the arithmetic operation using the period deviation is high in sensitivity, and therefore it seems that a misfire can be detected without a processing operation for each cylinder. However, in other operating ranges, the characteristic appears a reactive shock after the occurrence of a misfire as indicated at portion A in FIG. 6, as a result of which a cylinder which is operating normally may be erroneously determined as a cylinder which has misfired. Hence, the system is not always acceptable.

Now, let us consider the effect of the segment error of the revolution signal sensor with respect to the arithmetic system of r(i) in FIG. 3. For example, FIG. 7 shows a hole-type revolution signal sensor 3, and a revolution detecting rotor 3a. The rotor 3a is mounted on a crank shaft 3b. The revolution signal sensor 3 detects two segments A and B per revolution, or a crank angle of 360° (hereinafter referred to as "360°CA", when applicable). FIG. 8 is a timing chart indicating the segments A and B (FIG. 7) with the revolution signal. A revolution detecting operation ($T_L$, $T_U$ and T) is carried out by using the segment A for the No. 1 and No. 4 cylinders, and the segment B for the No. 3 and No. 2 cylinders. Therefore, mechanical dimensional errors in setting the angles of the segments A and B will affect the revolution period. This effect cannot be disregarded, because it corresponds to the deflection in revolution at the occurrence of a misfire in the case where the rotor 3a is 100 φ in diameter with an error of 0.1°CA, and the engine is operated at 6000 rpm and −400 mmHg.

Figure 9:
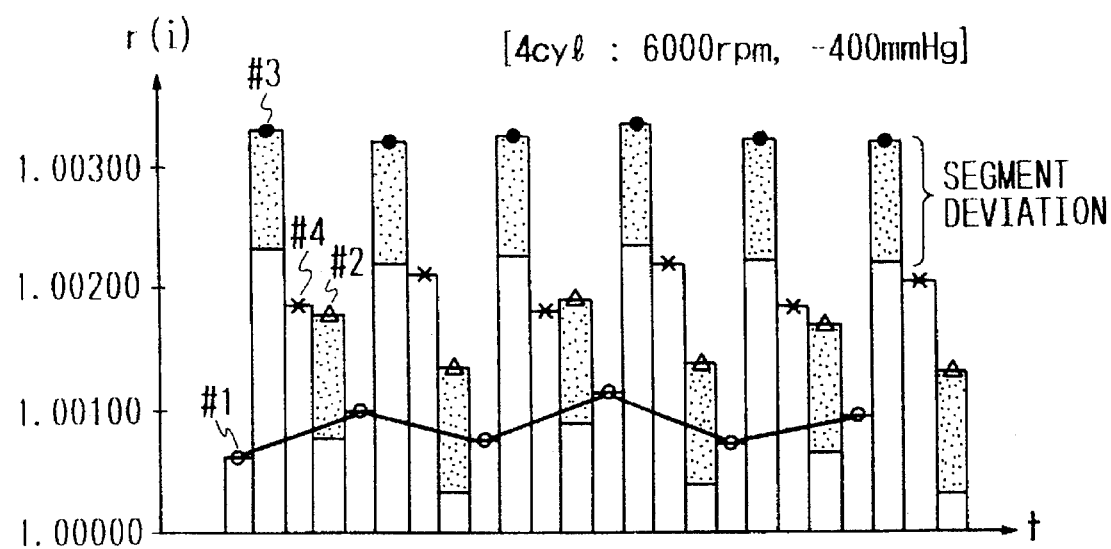
FIG. 9 is a characteristic diagram for a description of r(i) in the case where the combustion in the engine is normal, and segment errors are involved.
Figure 10:
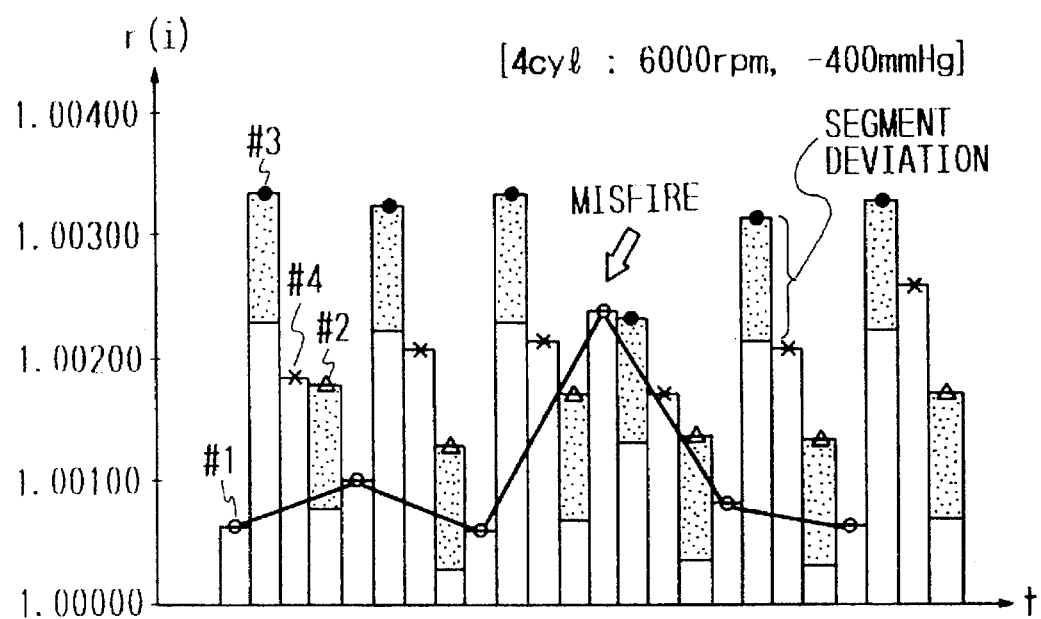
FIG. 10 is a characteristic diagram for a description of r(i) in the case where a misfire occurs in a cylinder #1 and segment errors are involved.

This effect is as shown in FIGS. 9 and 10. FIG. 9 shows r(i) in the case where a segment error is involved when the combustion is normal, and FIG. 10 shows r(i) in the case where a segment error is involved when the No. 1 cylinder misfires.

In FIG. 3, r(i) of the misfire cylinder is not so different from r(i) of the normal combustion cylinder. However, in the case where the segment error is involved, as shown in FIG. 9, r(i) varies greatly even when the combustion is normal, and therefore it is completely impossible to detect a misfire depending on the detection of the deflections of revolution which is made in the order of combustion of the cylinders.

As was described above, r(i) is calculated for each of the cylinders in the order of combustion of the cylinders, and then smoothed. When the resultant data is added to a predetermined data (0.001 in the case of FIG. 9 or 10) to obtain a threshold value, then not only the cylinder in which a misfire occurs can be detected, but also the occurrence of the misfire can be detected with high accuracy. The value to be added is not constant; that is, different values are employed for different operating ranges. Therefore, they should be listed in a map made up of numbers of revolutions per minute and loads (which, in the following flow chart, are charging efficiencies (CE) which are each obtained by dividing an intake air quantity by a number of revolutions per minute).

Figure 11:
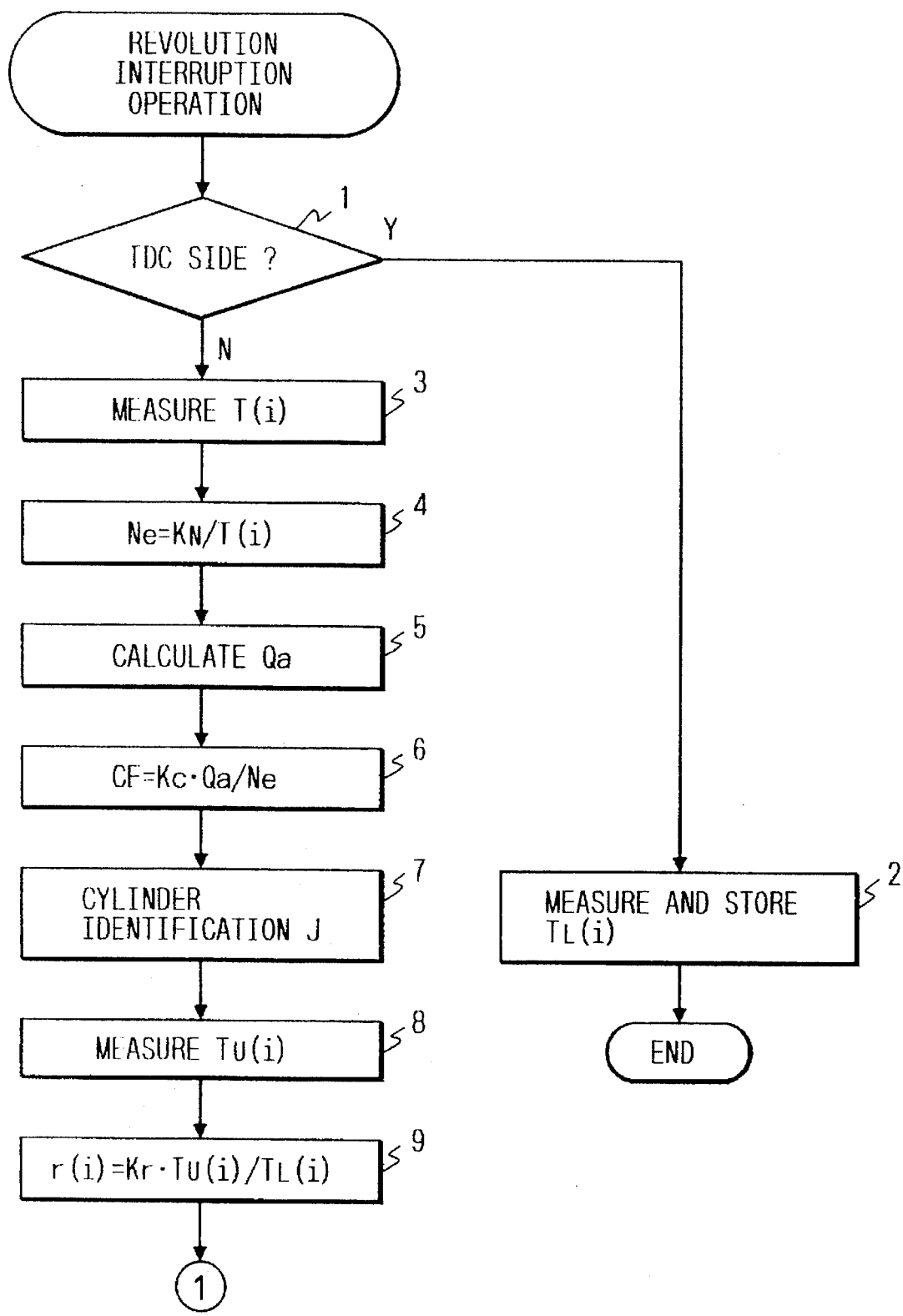
FIGS. 11 and 12 are two parts of a flow chart for a description of the operation of the misfire detecting device according to the invention.
Figure 12:
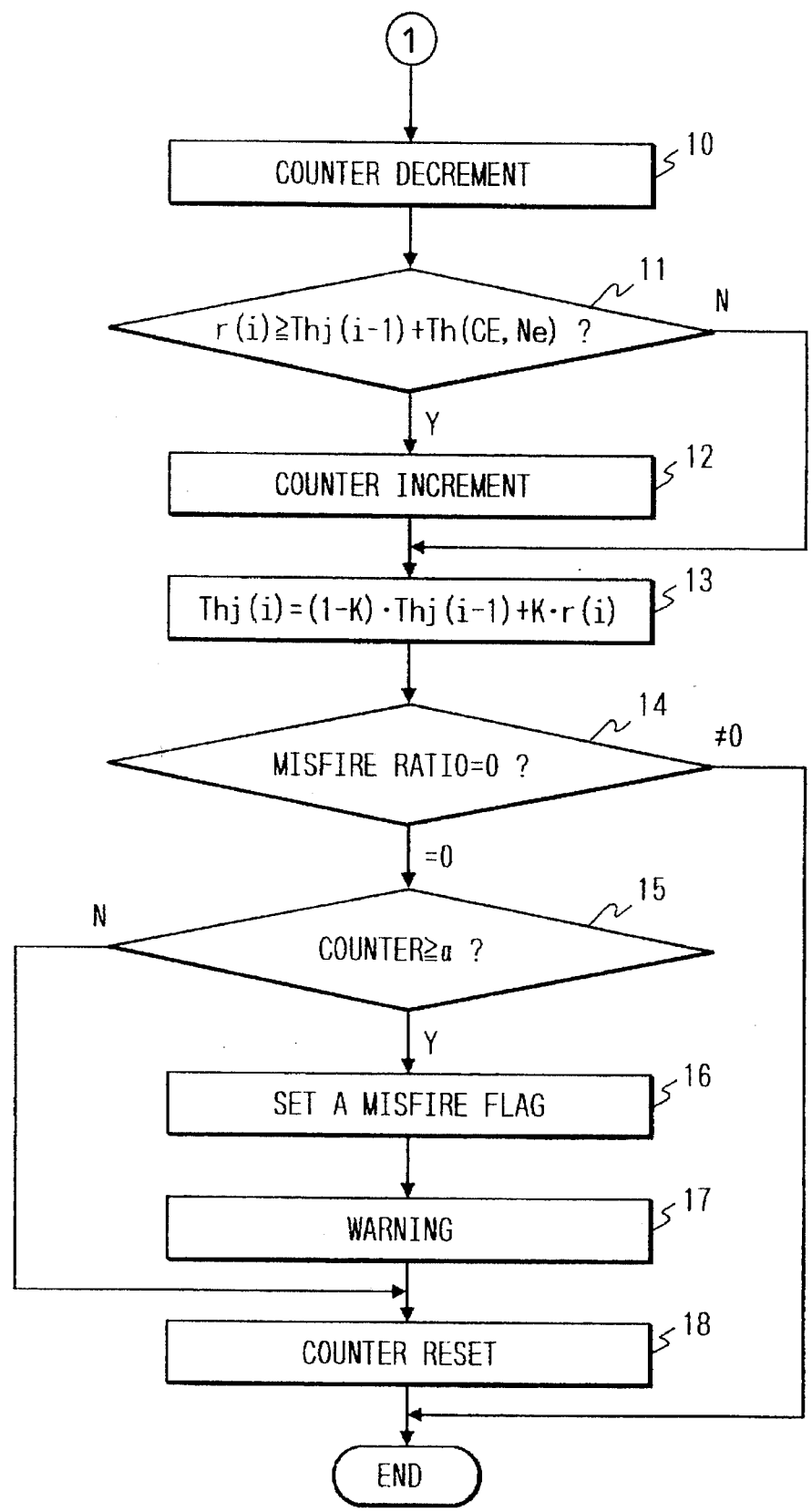

Now, a misfire detecting operation executed by the CPU 53 shown in FIG. 1(b) will be described with reference to FIGS. 11 and 12. There are two revolution interruption signals, which are the rise edge (BTDC70°CA) and the fall edge (TDC) of the revolution signal shown in FIG. 2. Therefore, in Step 1, it is determined which of the revolution interruption signals is provided. When it is determined that the revolution interruption signal is of the fall edge (TDC), in Step 2 the period $T_L(i)$ of the interval before TDC (which is the period of the interval in which the revolution signal is at "1" in FIG. 2) is measured, and the value $T_L(i)$ thus measured is stored. Then, the operation is ended. When, in Step 1, it is not of the fall edge (TDC), Step 3 is effected. In Step 3, a period T(i) is measured, and in Step 4 it is converted into the number of revolutions $N_e$ according to the following equation:

$$N_e = K_N/T(i)$$

where $K_N$ is the conversion coefficient.

In Step 5, a processing operation (not shown) is carried out to perform an intake-air quantity calculation in the period T(i) with a predetermined sampling cycle, and the resultant value is averaged to obtain an intake-air quantity $Q_a$. In Step 6, in order to determine a load, a charging efficiency CE is obtained according to the following equation:

$$CE = K_c Q_a/N_e$$

where $K_c$ is the coefficient.

In Step 7, the above-described processing operation identifies the cylinder, and the cylinder thus identified is referred to as a "j-th cylinder". Next, in Step 8, the period $T_U(i)$ of the interval after TDC (which is the period of the interval in which the revolution signal is at "0" in FIG. 2) is measured. In Step 9, the calculation of r(i) showing the period ratio is obtained according to the following equation:

$$r(i)=K_r T_U(i)/T_L(i)$$

In Step 10, an operation for controlling the warning lamp is carried out; that is, Step 10 is a routine in which a misfire rate is measured with a counter a predetermined number of cycles so that, when the misfire rate is higher than a predetermined value, it is determined that a misfire has occurred, and thee warning lamp 8 is turned on. Step 11 is a misfire decision routine. When, in Step 11, the following equation is established, in Step 12 the count value of the misfire counter of a j-th cylinder is increased:

$$r(i) \geqq Thj(i-1)+Th(CE, N_e)$$

where Thj(i−1) is the first threshold value which is obtained just previously with the j-th cylinder in Step 13, and Th(CE, $N_e$) is the second threshold value which is determined from the map by using $N_e$ and CE obtained in Steps 4 and 6 as a predetermined value. When, in Step 11, the above-described equation is not established, Step 13 is effected.

Step 13 is an arithmetic routine of the first threshold value Thj(i), in which r(i) is smoothed for every cylinder, to calculate the first threshold value. That is, the following calculation is carried out:

$$Thj(i)=(1-K)Thj(i-1)+K\,r(i)$$

where K is the constant which is larger than zero (0) and smaller than one (1) (0<K<1). Thus, Thj(i) is the result which is obtained when r(i) is passed through a primary filter reducing noise or smoothing the waveshape thereof or the like for every cylinder. In Step 14, it is determined whether or not the count value of the misfire rate is zero (0). When it is determined that it is not zero (0), then the operation is ended. When it is determined that it is zero, then the operation is advanced to Step 15.

In Step 15, it is determined whether or not the count value of the misfire counter of each cylinder is equal to or larger than a predetermined value $\alpha(\geqq\alpha)$. When it is determined that the count value of any one of the misfire counts is equal to or larger than the predetermined value, then in Step 16 a misfire flag is set for that cylinder, and in Step 17 the warning lamp 8 is turned on. The warning lamp 8 can be turned off by removal of the battery.

After Step 17, or when the count value of each misfire counter is smaller than α, then Step 18 is effected. In Step 18, the misfire counters of all the cylinders are reset, and the misfire rate measuring counter is initialized. As is apparent from the above description, for instance when a misfire is detected in a cylinder in a ratio of 3 to 100 or more, it is determined that a misfire has occurred in the cylinder, and the warning lamp is turned on. This is to eliminate the difficulty that transient phenomena such as noises are detected erroneously as the occurrence of misfires. In the flow chart shown in FIGS. 11 and 12, the detection of misfires has been described by using the arithmetic equation r(i); however, it should be noted that the detection of misfires can be achieved by using Δα(i) or S(i) which is less affected by the segment error.

As was described above, with the misfire detecting device of the invention, deflections in revolution of the engine are calculated in correspondence to the order of combustion of the cylinders in the engine, so that the deflections in revolution of the engine can be detected quickly, which contributes to improvement of the misfire detecting sensitivity. Furthermore, the misfire decision threshold value for the arithmetic values are determined from both the value obtained by smoothing the arithmetic values for the cylinders, and the predetermined value. This will eliminate the difficulty that the erroneous decision is made because of the mechanical dimensional error of the revolution detecting segments. In addition, the predetermined value is determined from the number of mechanical revolutions per minute and the load, which makes it possible to detect the occurrence of misfires in a wide range of operation.

While there has been described in connection with the preferred embodiment of this invention, it will be obvious to those skilled in the art that various changes and modifications may be made therein without departing from the invention, and it is aimed, therefore, to cover in the appended claims all such changes and modifications as fall within the true spirit and scope of the invention.

What is claimed is:

1. A misfire detecting device for an internal combustion engine having a plurality of cylinders comprising:

revolution detecting means for detecting a period of revolution of said engine;

arithmetic means for calculating a deflection in revolution of said engine for each of said cylinders on the basis of the period of revolution of said engine detected by said revolution detecting means in correspondence to the order of combustion of said cylinders;

smoothing means for smoothing the calculation value of the deflection obtained by said arithmetic means corresponding to each cylinder;

threshold value determining means for determining a misfire decision threshold value for said each cylinder on the basis of a predetermined value of the deflection and a value smoothed by said smoothing means corresponding to each cylinder; and misfire deciding means for subjecting said arithmetic values provided by said arithmetic means and said threshold value to comparison, to determine whether a misfire in any one of said cylinders has occurred.

2. A misfire detecting device as claimed in claim 1, in which said arithmetic means calculates a period ratio of a period of an interval after TDC (Top Dead Center) to a period of an interval before TDC, as the deflection.

3. A misfire detecting device as claimed in claim 1, further comprising predetermined value setting means for outputting the predetermined value to said threshold value determining means according to the revolution rate of said engine and a load on said engine.

4. A misfire detecting device as claimed in claim 1, further comprising counter means measuring a misfire rate to integrate the number of misfire decided by said misfire deciding means in a predetermined cycle.

5. A misfire detecting device as claimed in claim 4, in which said counter means includes comparing means comparing a predetermined number with the number of misfire measured by said counter means.

6. A misfire detecting device as claimed in claim 5, further comprising warning means for indicating a misfire condition when the number of misfire measured by said counter means is higher than the predetermined number.

* * * * *